(12) United States Patent
Bohn (10) Patent No.: US 9,335,866 B2
(45) Date of Patent: May 10, 2016

(54) RETRACTABLE TOUCHSCREEN ADAPTER

(71) Applicant: Otter Products, LLC, Fort Collins, CO (US)

(72) Inventor: David D. Bohn, Fort Collins, CO (US)

(73) Assignee: OTTER PRODUCTS, LLC, Fort Collins, CO (US)

( * ) Notice: Subject to any disclaimer, the term of this patent is extended or adjusted under 35 U.S.C. 154(b) by 71 days.

(21) Appl. No.: 14/543,044

(22) Filed: Nov. 17, 2014

(65) Prior Publication Data

US 2015/0138160 A1 May 21, 2015

Related U.S. Application Data

(60) Provisional application No. 61/906,665, filed on Nov. 20, 2013, provisional application No. 61/929,297, filed on Jan. 20, 2014.

(51) Int. Cl.
  *G06F 3/042* (2006.01)
  *G01B 11/00* (2006.01)
  *G06F 3/03* (2006.01)

(52) U.S. Cl.
  CPC ............ *G06F 3/0421* (2013.01); *G01B 11/002* (2013.01); *G06F 3/0304* (2013.01)

(58) Field of Classification Search
  CPC ..... G06F 3/0421; G06F 3/0304; G06F 3/042; G06F 3/03; G01B 11/002; G01B 11/14
  USPC ........................................ 345/175; 178/18.09
  See application file for complete search history.

(56) References Cited

U.S. PATENT DOCUMENTS

| | | |
|---|---|---|
| 3,184,847 A | 5/1965 | Rosen |
| 3,613,066 A | 10/1971 | Cooreman |
| 4,294,543 A | 10/1981 | Apple et al. |
| 4,420,261 A | 12/1983 | Barlow et al. |
| 4,553,842 A | 11/1985 | Griffin |
| 4,558,313 A | 12/1985 | Garwin et al. |
| 4,642,422 A | 2/1987 | Garwin et al. |
| 4,688,933 A | 8/1987 | Lapeyre |
| 5,196,835 A | 3/1993 | Blue et al. |
| 5,231,381 A | 7/1993 | Duwaer |
| 5,248,856 A | 9/1993 | Mallicoat |
| 5,365,461 A | 11/1994 | Stein et al. |
| 5,502,568 A | 3/1996 | Ogawa et al. |
| 5,734,375 A | 3/1998 | Knox et al. |
| 5,933,812 A | 8/1999 | Meyer et al. |
| 6,091,405 A | 7/2000 | Lowe et al. |

(Continued)

*Primary Examiner* — Jimmy H Nguyen (57) ABSTRACT

An apparatus for determining a location of an object on a planar surface is provided. The apparatus includes a retractable emitter strip, a retractable detector strip, and electrical circuitry. The retractable emitter strip is extendable from the apparatus and includes electro-optical emitters for generating optical energy and directing the optical energy across a planar surface. The retractable detector strip is extendable from the apparatus and includes optical detectors for receiving other optical energy directed across the planar surface from another instance of the apparatus. The retractable emitter strip and the retractable detector strip extend in different directions from the apparatus. The electrical circuitry drives the electro-optical emitters to produce the optical energy according to a pre-defined pattern and processes electrical signals received from the optical detectors to generate object location information. The electrical circuitry also wirelessly transmits the object location information to a system controller.

20 Claims, 8 Drawing Sheets

(56) References Cited

U.S. PATENT DOCUMENTS

| | | |
|---|---|---|
| 6,362,468 B1 | 3/2002 | Murakami et al. |
| 6,437,314 B1 | 8/2002 | Usuda et al. |
| 6,480,187 B1 | 11/2002 | Sano et al. |
| 6,522,395 B1 | 2/2003 | Bamji et al. |
| 6,603,464 B1 | 8/2003 | Rabin |
| 6,816,537 B2 | 11/2004 | Liess |
| 6,906,702 B1 | 6/2005 | Tanaka et al. |
| 7,050,048 B2 | 5/2006 | Ito |
| 7,532,206 B2 | 5/2009 | Morrison et al. |
| 8,009,152 B2 | 8/2011 | Kim et al. |
| 8,035,612 B2 | 10/2011 | Bell et al. |
| 8,355,012 B2 | 1/2013 | Chen et al. |
| 8,373,657 B2 | 2/2013 | Hildreth |
| 8,390,718 B2 | 3/2013 | Robinson et al. |
| 8,416,217 B1* | 4/2013 | Eriksson ............... G06F 1/1616 178/18.09 |
| 8,558,804 B2 | 10/2013 | Chen |
| 8,619,061 B2 | 12/2013 | Yen et al. |
| 8,723,789 B1 | 5/2014 | Rafii |
| 8,797,446 B2 | 8/2014 | Chou |
| 2001/0022579 A1 | 9/2001 | Hirabayashi |
| 2002/0015159 A1 | 2/2002 | Hashimoto |
| 2003/0071858 A1 | 4/2003 | Morohoshi |
| 2006/0007123 A1 | 1/2006 | Wilson et al. |
| 2006/0028442 A1 | 2/2006 | Bynum et al. |
| 2006/0132459 A1 | 6/2006 | Huddleston et al. |
| 2006/0202974 A1 | 9/2006 | Thielman |
| 2008/0062149 A1 | 3/2008 | Baruk |
| 2008/0225017 A1* | 9/2008 | Kim ..................... G06F 3/0421 345/175 |
| 2008/0259053 A1 | 10/2008 | Newton |
| 2009/0276734 A1 | 11/2009 | Taylor et al. |
| 2010/0066704 A1 | 3/2010 | Kasai |
| 2010/0085329 A1 | 4/2010 | Tseng et al. |
| 2010/0090986 A1 | 4/2010 | Wang |
| 2010/0295821 A1 | 11/2010 | Chang et al. |
| 2011/0043484 A1 | 2/2011 | Huang et al. |
| 2011/0051120 A1 | 3/2011 | Hartman et al. |
| 2011/0155479 A1 | 6/2011 | Oda et al. |
| 2011/0169775 A1 | 7/2011 | Liaw et al. |
| 2011/0205340 A1 | 8/2011 | Garcia et al. |
| 2011/0291988 A1 | 12/2011 | Bamji et al. |
| 2012/0018625 A1 | 1/2012 | McCarthy et al. |
| 2012/0056807 A1 | 3/2012 | Chapman et al. |
| 2012/0062905 A1 | 3/2012 | Kiyose |
| 2012/0065914 A1 | 3/2012 | Kiyose |
| 2012/0098795 A1 | 4/2012 | Lu et al. |
| 2012/0120028 A1 | 5/2012 | Kiyose |
| 2012/0127124 A1 | 5/2012 | Zanone et al. |
| 2012/0293555 A1 | 11/2012 | Okano |
| 2014/0204037 A1* | 7/2014 | Kim ..................... G06F 1/1647 345/173 |
| 2015/0049063 A1 | 2/2015 | Smith et al. |

* cited by examiner

RETRACTABLE TOUCHSCREEN ADAPTER

CROSS REFERENCE TO RELATED APPLICATIONS

This application claims priority to U.S. Provisional Patent Application 61/906,665 filed Nov. 20, 2013, and U.S. Provisional Patent Application 61/929,297 filed Jan. 20, 2014, both of which are incorporated by reference herein in their entireties.

FIELD

The present application relates to apparatuses, systems, and methods for determining a position of an object on a surface.

BACKGROUND

Developments in technology have changed ways in which information is displayed and communicated to and between groups of people. Traditional chalkboards and whiteboards have significant drawbacks with respect to not being integrated with electronic computer and information systems. First, traditional chalkboards and whiteboards cannot be easily integrated with electronic information displays, such as liquid crystal displays (LCDs) and projectors. Second, traditional chalkboards and whiteboards require specialized writing surfaces that are compatible with chalk, dry erase markers, and/or similar writing tools. Third, information written on these types of surfaces is not easily captured electronically for computerized processing, transfer, and/or display. While some whiteboards have electronic scanning capability, traditional electronic scanning solutions can be costly for large whiteboards or surfaces as the scanning mechanism(s) must typically span the entire whiteboard, or span an entire dimension of the whiteboard, and must be designed to accomplish controlled mechanical movement of an apparatus across at least one dimension of the whiteboard.

The problems discussed above have been addressed in various ways. In one solution, a touchscreen or touchpad is overlaid across an entire electronic display surface. Touchpads typically sense a finger or stylus using one of several methods including capacitive sensing, conductance sensing, and/or using a pressure sensitive membrane of some type. These methods require that the display surface be overlaid or integrated with electrical and/or mechanical hardware which enables the surface to become touch sensitive. The cost of adding these types of touch sensing technologies to displays increases proportionally, and in some cases exponentially, with the increasing surface area of the screen. In some situations, the cost increases even further due to manufacturing yield issues associated with making devices for large devices or surfaces.

In another solution, sides or edges of electronic surfaces and/or writing surfaces are lined with optical emitters and detectors. The emitters optically direct beams of light or infrared energy across the display surface from one side to another. The detectors receive the light or energy and detect the presence of a finger, stylus, or other object on the surface through interruption or scattering of the beams of light. The emitters may be operated in various patterns, sequences, and/or pulses to make the object position determination more accurate and/or to identify the location of multiple objects on the surface. In this approach, the emitters and detectors must be permanently, or semi permanently, attached to the electronic or writing surface. This approach is not ideal because attaching the emitters and detectors to an existing surface and/or orienting them with the surface may be complex, time-consuming, unreliable, and/or expensive.

SUMMARY

In order to solve one or more of the problems discussed above, an apparatus for determining a location of an object on a planar surface is provided. The apparatus includes a retractable emitter strip, a retractable detector strip, electrical circuitry, and a power source. The retractable emitter strip is extendable from the apparatus and includes electro-optical emitters for generating optical energy and directing the optical energy across the planar surface. The electro-optical emitters are distributed along the length of the emitter strip. The retractable detector strip is extendable from the apparatus and includes optical detectors for receiving other optical energy directed across the planar surface from another instance of the apparatus. The optical detectors are distributed along a length of the retractable detector strip. The retractable emitter strip and the retractable detector strip extend in different directions from the apparatus. The electrical circuitry is configured to electrically drive the electro-optical emitters to produce the optical energy according to a pre-defined pattern and process electrical signals received from the optical detectors to generate object location information. The object location information relates to the location of an object on the planar surface. The electrical circuitry also wirelessly transmits the object location information to a system controller. The power source may power one or more of the electro-optical emitters, the optical detectors, and the electrical circuitry.

As described in further detail below, a writing, drawing, or viewing surface can be adapted to include electronic capture capabilities using the disclosed techniques, apparatuses, systems, and methods. Because the apparatuses and systems disclosed herein utilize emitters and detectors disposed on retractable and/or flexible strips or tapes, these apparatuses and systems can be adapted to writing, drawing, or viewing surfaces of a variety of sizes. The apparatuses and systems may also be adapted to writing, drawing, or viewing surfaces that did not previously include touch sensitive capability or were not designed to accommodate touch sensitive capability. In addition, the disclosed apparatuses and systems are relatively compact, easily transportable when in stowed positions, and may be easily transferred from one surface to another.

The disclosed techniques, apparatuses, systems, and methods may also be used in conjunction with electronic display devices to add touch sensitive capability to those devices. In one example, an exemplary apparatus is placed at or near each of two opposite corners of an LCD display which did not previously have touch detection capability. Two sets of flexible, retractable tapes of emitters and detectors are extended out along adjacent edges of the LCD display to create a perimeter of emitters and detectors around or near the edges of the LCD display. The emitters and detectors are then used to determine the presence of objects, such as a person's finger, at or near the surface of the LCD display.

While prior solutions use emitters and detectors arranged around a surface to detect object positions, the disclosed apparatuses and systems provide several unique benefits over existing methods because they can be flexibly adapted to displays or writing surfaces of various sizes. In addition, they can be adapted to displays or writing surfaces that do not have built in or integral touch capability. In addition, the disclosed apparatuses and system can be easily transported and switched between displays or writing surfaces. Furthermore, the apparatuses and systems disclosed herein may provide a more economical solution compared to existing methods.

Other techniques introduced herein also include other apparatuses, systems, and/or methods with various components. The techniques introduced herein may also include non-transitory machine-readable storage media storing instructions that, when executed by one or more computer processors, direct the one or more computer processors to perform the methods, variations of the methods, portions of the methods, or other operations described herein. While multiple embodiments are disclosed, still other embodiments will become apparent to those skilled in the art from the following detailed description, which shows and describes illustrative embodiments of the invention. As will be realized by those skilled in the art, the techniques disclosed herein are capable of modifications in various aspects, all without departing from the scope of the present invention. Accordingly, the drawings and detailed description are to be regarded as illustrative in nature and not restrictive.

DETAILED DESCRIPTION

In the following detailed description, various specific details are set forth in order to provide an understanding of and describe the systems, apparatuses, methods, and techniques introduced herein. However, the systems, apparatuses, methods, and techniques may be practiced without the specific details set forth in these examples. Various alternatives, modifications, and/or equivalents will be apparent to those skilled in the art without varying from the spirit of the introduced systems, apparatuses, methods, and techniques. For example, while the examples described herein refer to particular features, the scope of this solution also includes techniques and implementations having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

Various types of electronic whiteboards and interactive displays have been developed to address the shortcomings of traditional whiteboards and chalkboards discussed above. Some of these systems use touchpads or touchscreens that span an entire display or writing area and/or are integrated into the display. While this approach has been widely accepted for devices such as smartphones and tablet computers having relatively small displays, touchscreens are a costly solution when a large display and/or writing area is desired. Other systems for capturing written information on a surface include multiple sensors or devices that are permanently or semi-permanently integrated into or onto the surface. Often, these types of systems are not easily transportable or adaptable to various surfaces.

In other solutions, some systems use one or more of various types of cameras which view a writing surface from a distance in order to capture the movements of a stylus or capture writing on the surface. In addition to requiring costly components, these systems require that some of the components be positioned a distance away from the writing surface at a location from which the writing surface can be viewed. This type of configuration requires additional space, often has more complex setup and configuration requirements, and requires a view of the writing surface that is not obstructed by users or objects.

Systems, apparatuses, methods, and techniques introduced herein resolve the problems and shortcomings discussed above. In one example, an apparatus for determining a location of an object on a planar surface is provided. The apparatus includes a retractable emitter strip, a retractable detector strip, electrical circuitry, and a power source. The retractable emitter strip is extendable from the apparatus and includes electro-optical emitters for generating optical energy and directing the optical energy across a planar surface. The electro-optical emitters are distributed along the length of the emitter strip. The retractable detector strip is extendable from the apparatus and includes optical detectors for receiving other optical energy directed across the planar surface from another instance of the apparatus. The optical detectors are distributed along a length of the retractable detector strip. The retractable emitter strip and the retractable detector strip extend in different directions from the apparatus. The electrical circuitry is configured to electrically drive the electro-optical emitters to produce the optical energy according to a pre-defined pattern and process electrical signals received from the optical detectors to generate object location information. The object location information relates to the location of an object on the planar surface. The electrical circuitry also wirelessly transmits the object location information to a system controller. The power source may power the electro-optical emitters, the optical detectors, and/or the electrical circuitry.

The examples and descriptions which follow use the term "write" and "writing" to describe motions a user makes with a stylus, finger, pointer, or other object. As used herein, the terms "write" or "writing" do not necessarily include making a physical mark on a surface or object. The "writing" may simply include physical motions which are electronically captured using the techniques described here. Using these techniques, "writing" may be performed without physically marking a surface, without using a device that is capable of physically marking a surface, and/or without using a surface that is capable of being physically marked. In addition, "writing" may represent information or communications other than words, letters, and numbers. "Writing" may include artistic representations, symbols, or other forms of information or communication that, using traditional methods, would be marked on some type of object or surface. In some examples, "writing" is electronically displayed on a display device as a representation of a physical mark even though no physical mark was made.

Furthermore, some of the techniques disclosed herein are discussed in terms of determining a location of an object on a surface. It should be understood that writing or writing motion can be captured and/or approximated by determining successive locations of an object on a surface over a period of time. The successive locations represent a path of the object across the surface. The location of the object may be sampled periodically at a sufficient frequency, relative to the writing motion, to enable the writing to be approximated by interpolating and/or connecting the sampled data points.

Figure 1:
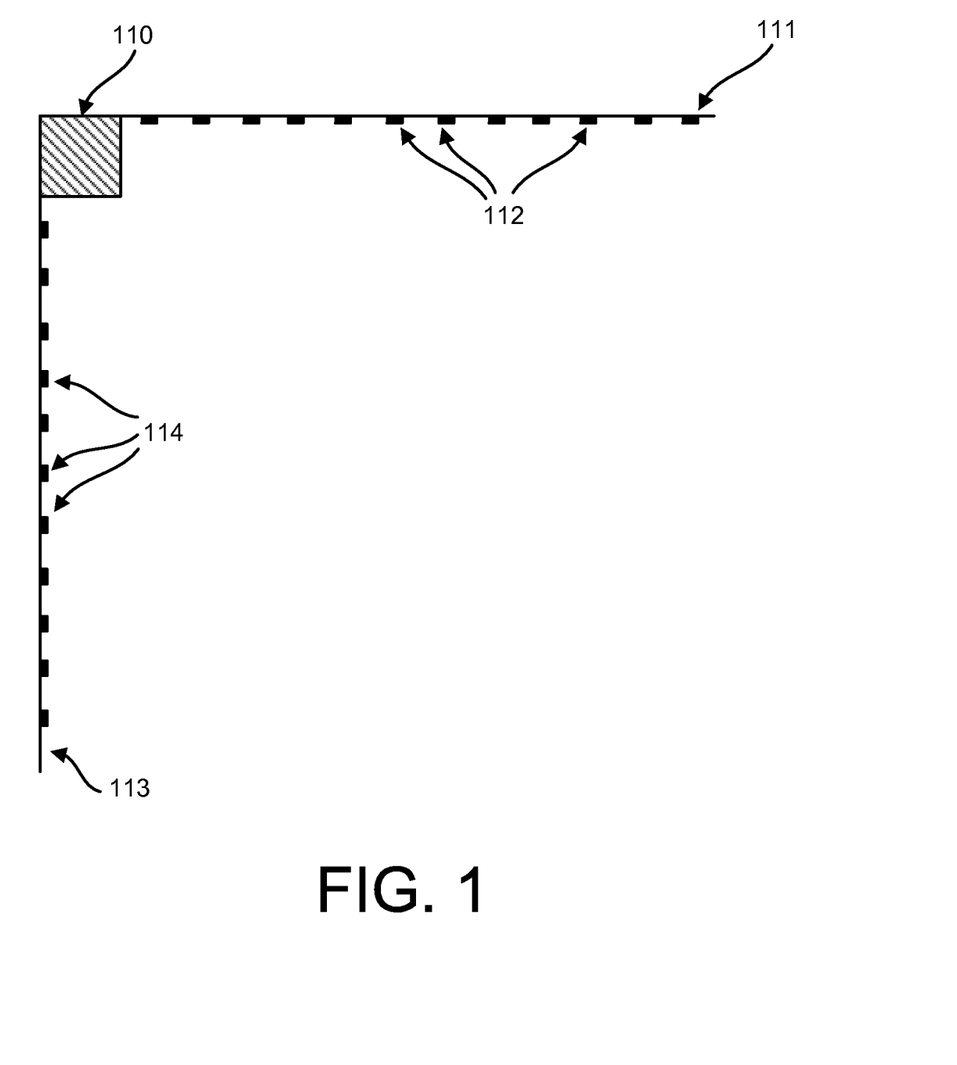
FIG. 1 illustrates an apparatus for determining a position of an object on a surface in accordance with techniques introduced herein.

FIG. 1 illustrates an apparatus 110 for determining a position of an object on a surface. Apparatus 110 includes retractable emitter strip 111 and retractable detector strip 113. Retractable strips 111 and 113 are shown in extended, or at least partially extended, positions. Retractable strips 111 and 113 retract into apparatus 110 either fully, or partially. In one example, retractable strips 111 and 113 retract into apparatus 110 in a manner similar to that in which a metal measuring tape retracts into a measuring tape housing. Retractable strips 111 and 113 are described as "strips" or "tapes" but may comprise any type of flexible, bendable, foldable, and/or shapeable components. Retractable strips 111 and 113 may include a substrate or other material that can be rolled up but also tends to relax into a linear, or near linear, shape when extended or unrolled, similar to a metal tape measure.

Retractable emitter strip 111 includes electro-optical emitters 112. Electro-optical emitters 112 are a group of optical and/or infrared energy sources such as light emitting diodes (LEDs), laser diodes, lasers, superluminescent light-emitting diodes (SLEDs), organic light emitting diodes (OLEDs), and/or the like. Electro-optical emitters 112 are distributed across the length of retractable emitter strip 111 and may be organized as individual elements or may be arranged in groups of elements. Retractable emitter strip 111 may also include wires, cables, or electrical circuitry for electrically connecting to and/or driving electro-optical emitters 112. The wires, cables, or electrical circuitry may also be used for providing power to electro-optical emitters 112. While FIG. 1 illustrates a single row or line of optical emitters, many other configurations are possible, including multiple rows, staggered rows, pairs, and/or other arrangements.

Retractable detector strip 113 includes optical detectors 114. Optical detectors 114 are a group of optical and/or infrared detectors such as photo-detectors, photocells, photovoltaic devices, charge coupled devices (CODs), photo-resistors, photo-transistors, and/or the like. Detectors 114 are distributed across the length of the retractable tape and may be organized as individual elements or in groups. Retractable detector strip 113 may also include wires, cables, or electrical circuitry for receiving data from optical detectors 114. The wires, cables, or electrical circuitry may also be used for providing power to optical detectors 114. While FIG. 1 illustrates a single row or line of optical detectors, many other configurations are possible, including multiple rows, staggered rows, pairs, and/or other arrangements.

Existing technologies are known for manufacturing flexible LED strips or light bars and similar technologies may be used for manufacturing retractable emitter strip 111 and/or retractable detector strip 113. In some cases, one or more of the retractable strips may be implemented in waterproof, weatherproof, dirt proof, or dust proof assemblies.

Apparatus 110 may also include electrical circuitry, electronic circuitry, and/or one or more computer processors for operating and/or controlling electro-optical emitters 112. Apparatus 110 may also include electrical circuitry, electronic circuitry, and/or one or more computer processors for operating, controlling, and/or receiving information from optical detectors 114. The circuitry or processors that control electro-optical emitters 112 may be the same or different than the circuitry or processors that control optical detectors 114.

Apparatus 110 may also include components for communicating with other instances of apparatus 110 and/or for communicating with other devices. The communication may be through a wired connection or through a wireless communication link, such as Bluetooth, Bluetooth Low Energy, or Wireless Fidelity (WiFi). Other communication methods, protocols, or formats are possible. Apparatus 110 may also include other components such as a housing, a mounting mechanism, an attachment mechanism, a switch, a charging port, an electrical interface, an antenna, a power source, a power supply, a battery, and/or a status indicator. Apparatus 110 may be permanently, semi-permanently, or temporarily attached to a display for use. Attachment may be accomplished using an adhesive, a clip, a fastener, a snap, a suction cup, a hook, a bracket, a hook and loop fastener, a magnet, an electromagnet, another attachment means, and/or a combination thereof.

Beneficially, retractable strips 111 and 113 may be retracted, rolled up, folded, or otherwise placed into a stowed configuration in or on apparatus 110 that is spatially more efficient. In some cases, retractable strips 111 and 113 may roll up on a spool or spindle inside apparatus 110 when not in use. In the stowed configuration, all or most of retractable strips 111 and 113 are retracted into apparatus 110. The stowed configuration provides for improved transport and storage of apparatus 110, as well as provides physical protection for the emitters and detectors when they are not in use. Retractable strips 111 and 113 may retract using a spring loaded mechanism or may retract with assistance of an electrically powered mechanism. Alternatively, a user may manually wind, fold, or roll retractable strip 111 and/or 113 onto or into apparatus 110 when not in use.

Retractable strips 111 and 113 may be extended to user selectable lengths as needed. In one example, retractable strip 111 and 113 may each have a fully extended length of 60 inches. However, a particular display surface may have dimensions of 52 inches by 38 inches and the respective retractable strips may be extended only to the lengths necessary to span those dimensions. In this way, apparatus 110 may be used with and adapted to a wide range of displays, display sizes, surfaces, and/or work areas. Apparatus 110 may be manufactured in two or more size ranges. For example, one model may be usable for displays having display areas dimensions in the range of a few inches to forty inches, while another model may be designed for use with displays having dimensions in the range of forty inches to seventy inches. Many other size ranges are possible.

As illustrated in FIG. 1, retractable emitter strip 111 and retractable detector strip 113 extend in different directions from apparatus 110. Specifically, the retractable strips may extend in directions that are ninety degrees, near ninety degrees, substantially ninety degrees, or about ninety degrees relative to each other in order to align or correspond with two sides of a square or rectangular shaped display, display area, or work area.

Figure 2:
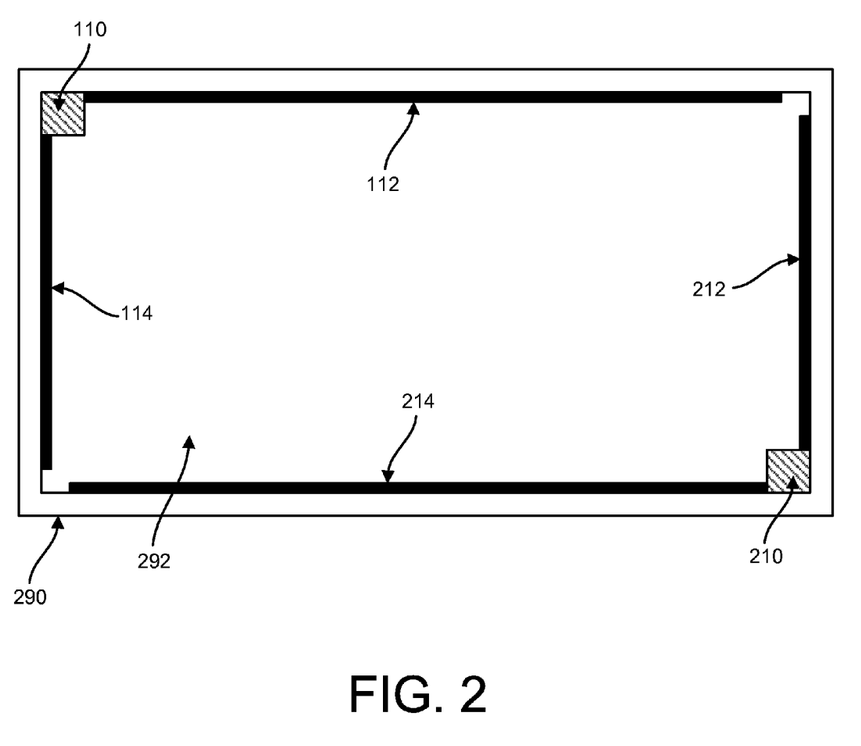
FIG. 2 illustrates two position determining apparatuses in use with a display in accordance with techniques introduced herein.

FIG. 2 illustrates apparatus 110 and apparatus 210 in use with monitor 290 in accordance with techniques introduced herein. Apparatus 210 is an example of apparatus 110, although the devices may differ in some ways as described in further detail below. Apparatus 110 and apparatus 210 are placed at opposite corners of display area or surface of interest. In the example of FIG. 2, they are placed at or near the corners of display screen 292 of monitor 290. Monitor 290 may be any type of information display such as an LCD display, a cathode ray tube (CRT) display, a plasma display, an e-ink display, or the like. In other applications, apparatuses 110 and 210 may be used with a projector or image projection system. For example, apparatuses 110 and 210 may be used with a non-electronic surface onto which an image is projected such as a wall, floor, or screen. In yet other applications, the apparatuses may be used on other non-electronic surfaces that do not have information displayed or projected on them, such as a wall or floor.

Apparatus 210 includes retractable strips similar to those of apparatus 110. The retractable strips include emitters 212 and detectors 214. Emitters 212 are examples of electro-optical emitters 112 of apparatus 110. Detectors 214 are examples of detectors 114 of apparatus 110. When arranged as illustrated in FIG. 2, emitters 112 of apparatus 110 direct optical energy in a direction toward detectors 214 of apparatus 210 and emitters 212 of apparatus 210 direct optical energy in a direction toward detectors 114 of apparatus 110. The optical energy is directed across the surface of display screen 292 of monitor 290 from the emitters in beams, fans, cones, or other specified shapes or widths. The optical energy is generally directed along a plane or a planar surface but may fan outside the plan to some extent in some cases.

The optical energy transmitted by the emitters is received by one or more of the detectors, such as optical detectors 114 or 214, along the opposing side of the display screen. Because the optical energy is directed from each emitter in known directions or patterns, the receive pattern at the detector has known characteristics when no object is present on or near the surface of the display screen. Consequently, the presence of a finger, object, or stylus at the surface can be detected through interruption of the optical energy and/or the known patterns. The number of opposing emitters from which a particular detector may receive optical energy may depend on the type of emitters used. In some cases, emitters that have very narrow beams, such as a laser, may be used. In other cases, emitters have wider cones of transmission may be used such that a single detector receives optical energy from multiple opposing emitters in different locations. In the latter case, multiple detectors may receive optical energy transmitted by a single emitter.

The emitters may also be operated in many different patterns or sequences in order to improve the object location determination capability. For example, one or multiple of the emitters may be activated at a particular time. Many combinations and sequences are possible. Similarly, the detectors may not all be operated simultaneously, may be read sequentially, and/or may be read according to a specified pattern. In some cases, a detection pattern or sequence may be used in coordination with a pattern or sequence of activation of the emitters. Because multiple emitters and detectors are used, detection of multiple simultaneous, or nearly simultaneous, touches of the surface may be possible because optical energy is being directed across the surface in multiple directions at the same time. Optical energy captured from the detectors in one direction may be combined with optical energy captured from another direction may be combined, or used together, to determine a location of a finger, object, or stylus on display screen 292.

In some cases apparatus 110 and apparatus 210 may be configured as or described as "master" and "slave." Because they are operated in a complementary manner, information from both apparatus 110 and apparatus 210 must be combined and/or processed together in order to determine an object location. In some cases, the master apparatus controls the overall operation of the process by sending commands to the slave apparatus regarding how and when to operate the emitters and detectors of the slave apparatus. In other words, electrical circuitry and/or one or more computer processors in the master apparatus control the operation, send commands to the slave apparatus, and receive data from the slave apparatus. In some cases, apparatus 110 and apparatus 210 may each include the same hardware, software, and/or other capabilities such that either is capable of operating as a master or slave at any particular time. In this situation, the mode for each may be selected by the user or may be automatically arbitrated among the two units. In other configurations, each of the apparatuses may be permanently configured as either a master or slave device.

In other configurations, the control and/or processing tasks may be distributed between apparatus 110 and apparatus 210 such that there is no "master" or "slave." In yet other configurations, the control or processing functions may be performed by another computing device or system controller that apparatus 110 and apparatus 210 both communicate with and receive commands from. Many computing configurations are possible and the techniques disclosed herein are not to be limited to any particular computing configuration, computing architecture, or allocation or distribution of tasks.

Communication between apparatus 110, apparatus 210, and/or any other computing device may be conducted using wired or wireless communication. Wired communication may be performed using a cable and any communication protocol. Wireless communication may be performed using one or more known techniques, formats, or protocols (e.g., Bluetooth, Bluetooth Low Energy/Smart, ANT+, WiFi, RFID, IrDA, or Zigbee). Alternately, communication between the devices may be conducted using a proprietary wired or wireless communication format. In some cases, communications between the devices may be encrypted, secured, or otherwise protected.

After apparatus 110 and apparatus 210 are placed on a display device or surface, a calibration process may be performed such that more accurate object location determinations can be made. The calibration process may involve displaying one or more targets on the display or surface and requiring the user to touch the one or more targets with a finger or stylus. While the finger or stylus is in position, information is gathered from the detectors to synchronize the detected location with the displayed target location. These processes may be controlled by the apparatus or may be controlled by a computer communicating with apparatus. In either case, the information must be coordinated with a computing device controlling display screen 292 in order to identify calibration locations or targets.

The systems and apparatuses disclosed herein differ from prior solutions in that the functionality of the emitters and detectors is distributed among two devices that may be applied to monitors or display surfaces which do not inherently have this functionality. In addition, the systems and apparatuses disclosed herein differ from prior solutions in that they may be adapted to monitors or writing surfaces of various types because the emitter and detector strips are retractable and/or extendable to various and/or user-selectable lengths. Further, because the emitter and detector strips are flexible and can be rolled or folded, the apparatuses and systems disclosed herein are relatively compact when not in use and may be easily transported from one writing surface or display to another.

Data or information produced or output from the apparatuses, techniques, and systems disclosed herein may be used in a variety manners. In one example, information captured at or near the surface of an electronic display screen may be processed to electronically display markings or selections on the display screen in a manner similar to that sometimes used with conventional touchscreen displays. The touch information may be received and processed such that corresponding marks are electronically displayed as if the user is writing on the display. This approach provides the appearance that the user is marking or writing on the screen although the marks are electronically generated and no physical marking is taking place.

In another example, the surface may be a non-electronic or non-operational surface, such as a wall, onto which an image is projected from a projector. The captured information may be fed to the projecting device, or to a second projecting device, to project the user's "writing" onto the non-operational surface in conjunction with the existing image. In yet another example, the surface from which the touches or object location is captured may be a surface which is not used for display or projection. The user's "writing" or movements on the blank surface may be captured for storage or display in another location even though nothing is physically displayed or projected on the "writing" surface.

Duplication of a writing motion made using a finger, stylus, or other object on a surface as discussed herein may also include determining when the object is actually in contact with the surface, versus hovering slightly above the surface. Determining when the object is in contact with the surface may be important in generating electronic information that reflects the writing that a user of the object intended. Determining when the object is in contact with the surface, or sufficiently near the surface to be interpreted or understood as being in contact with the surface, may be accomplished using one or more of the techniques discussed below.

In one example, the detectors may have sufficient accuracy to determine when the object is actually in contact with the surface, versus near the surface. In another example, the object is a stylus containing a switch at its tip that is activated when the stylus is pressed against a surface. The stylus may transmit a signal to one or more components of the system, including apparatus 110, apparatus 210, and/or a system controller, indicating when the switch is or is not triggered. In yet another example, the stylus may contain a proximity sensor at its tip that indicates when the stylus is within a specified distance of a surface. In yet another example, the object may be a stylus that contains a switch that is activated by the user. The operation of the stylus may be dependent upon the user activating the switch when the stylus is intended to be "writing." In this implementation, the stylus could be used without actually pressing it against a surface. In other words, the user could use the stylus to write in free space and use the switch to indicate when the stylus should be active and when it should not be active.

A stylus may also be configured to detect how hard a user is pressing the stylus against a surface. This information may be used in determining characteristics of an electronic representation of the user's writing. For example, when a user presses harder on the stylus, a line width of the electronically generated line may increase to visually represent that action. This may be accomplished in a number of ways. In one approach, the stylus may include a spring loaded tip that depresses in proportion to the amount of force applied to the stylus against the surface. A sensor, such as a hall effect sensor, may be used to detect how far the tip has been depressed into the stylus. Alternately, a strain gauge or other type of spring mechanism or pressure sensor may be used to determine how much force is being applied to the stylus by the user.

In one variation of the examples herein, electrical, electronic, and/or electrostatic methods may be used to determine when there is contact between an object and a planar surface. In other words, the techniques described herein may be used to optically determine the location of a finger or stylus on or near a surface without optically determining whether contact is being made. Electrical, electronic, and/or electrostatic contact information is used in conjunction with the optical information to implement an electronic whiteboard or virtual writing surface. While this approach may require some type of touch sensing capability to be implemented on the writing surface, this solution can, nonetheless, be more cost effective than a traditional touchscreen panel because this implementation does not require that the touch-sensing elements be capable of detecting or indicating where on the surface contact has been made, it simply requires an indication that contact has been made somewhere on the surface. The location of contact on the surface may still be determined using the techniques described herein.

Figure 3:
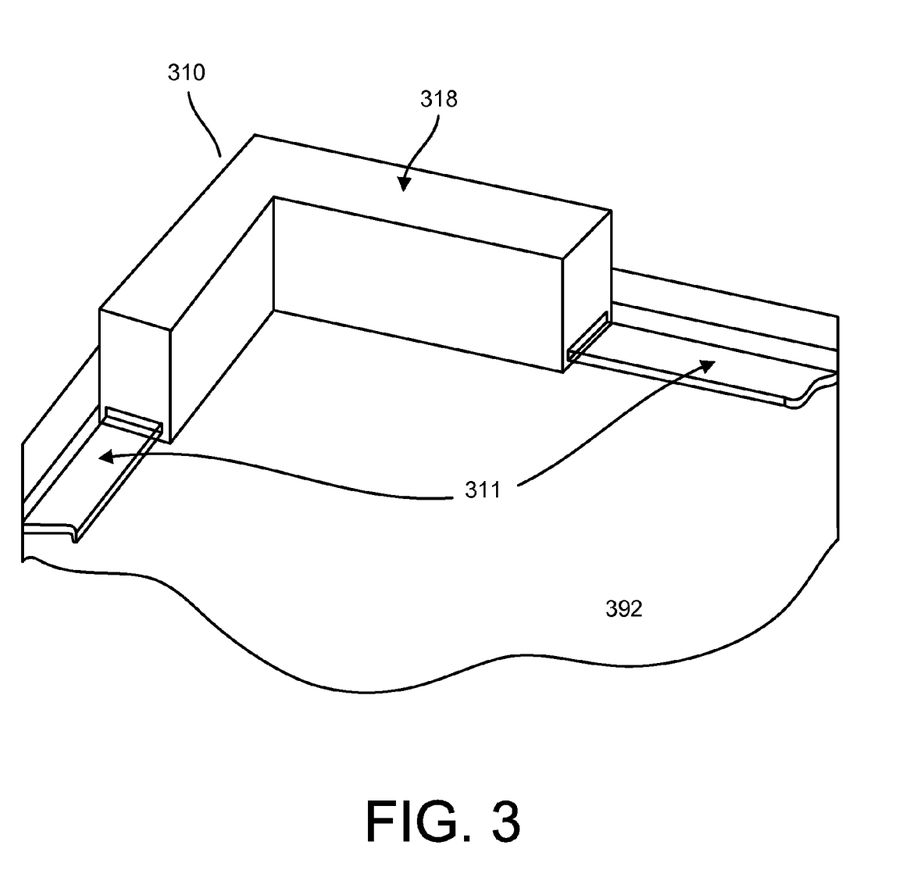
FIG. 3 illustrates a perspective view of an apparatus for determining a position of an object on a surface.

FIG. 3 illustrates a perspective view of apparatus 310 for determining a position of an object on a surface 392. Apparatus 310 is an example of apparatus 110 and/or apparatus 210. Apparatus 310 includes flexible retractable strips 311 which retract and extend from housing 318. Flexible retractable strips 311 are examples of retractable emitter strip 111 and/or retractable detector strip 113 and include emitters and/or detectors to operate in accordance with the techniques disclosed herein. Housing 318 includes enough physical volume such that flexible retractable strips 311, when not in use, can roll or fold into housing 318 for storage or transport. Surface 392 may be associated with an electronic display device such as an LCD display, an electronic display, a monitor, and/or a television. Surface 392 may also be associated with a non-electronic surface such as a projection screen, a whiteboard, a wall, a floor, and/or a ceiling.

Figure 4:
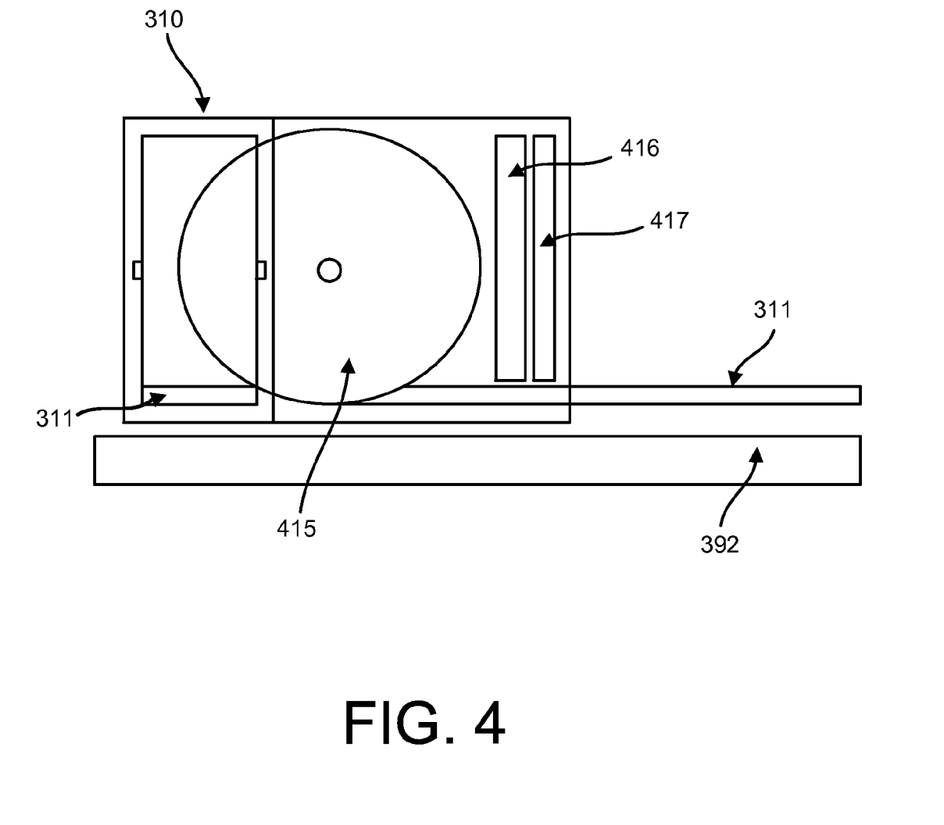
FIG. 4 illustrates a side view of an apparatus for determining a position of an object on a surface.

FIG. 4 illustrates a side view apparatus 310 and internal components of apparatus 310. The unused portion of flexible retractable strip 311 is stored on spool 415 inside apparatus 310 in a manner similar to that in which a flexible measuring tape is rolled up inside a tape measure housing. Spool 415 may include spring loaded mechanical features for retracting flexible retractable strip 311 and/or may be electrically powered. Apparatus 310 also includes printed circuit board (PCB) 417. PCB 417 may include digital circuitry, analog circuitry, discrete digital components, discrete analog components, other electrical components, and/or one or more computer processors for performing the various techniques described herein and/or for communicating with other devices.

In FIG. 4, apparatus 310 also includes power source 416. Power source 416 includes one or more electrical components for powering the various elements of apparatus 310. Power source 416 may include a battery, a rechargeable battery, a capacitor, a supercapacitor, a solar cell, and/or a fuel cell that allows apparatus 310 to be operated, at least temporarily, without being tethered to an external power source. Power source 416 may also include components for interfacing to an external power source, such as a power supply, for recharging a rechargeable battery of the device.

In addition, apparatus 310 may include other components as described in other examples herein. In some cases, apparatus 310 may include mechanical and/or electrical components which detect how far one or more of strips 311 has been extended. This enables apparatus 310 to activate, utilize, and/or operate only those emitters and/or detectors which are in extended portions of strips 311 and are necessary to cover a selected display area or surface. The remaining emitters and detectors which are still inside the housing or on spool 415 are not activated or utilized.

In one variation, one or more of the retractable strips or tapes described herein may be implemented using one or more telescoping features rather than a flexible strip or tape that rolls or folds. The emitters and/or detectors may be distributed along the telescoping features. The telescoping features may include any combination of parts that slide out from one another in order to make the apparatus more compact for purposes of transport or stowage. In addition to providing a convenient means of expanding/retracting the apparatus, the telescoping features described herein may also provide a more rigid structure for the emitters and detectors. The rigid structure may serve to maintain the orientation and or alignment of the emitters and/or detectors with respect to the surface of interest and/or with respect to each other.

Figure 5:
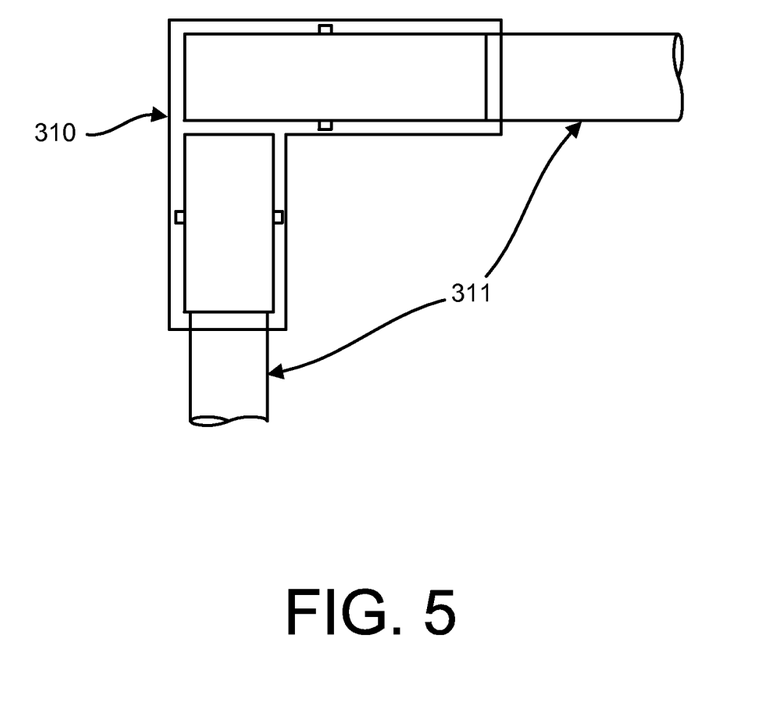
FIG. 5 illustrates a top view of an apparatus for determining a position of an object on a surface.

FIG. 5 illustrates a top view of apparatus 310. In FIG. 5, both of flexible retractable strips 311 are at least partially extended. Retractable strips 311 are illustrated as having a relative orientation of approximately ninety degrees. This configuration is suitable for using two instances of the apparatus to encompass the perimeter of a square or rectangular display. In some cases, the retractable strips or tapes may have an orientation other than ninety degrees in order to be compatible with shapes other than squares or rectangles. In other cases, the orientation between the retractable strips or tapes may be user adjustable or selectable.

In contrast to the configurations described above with respect to FIGS. 1-5, the apparatuses, techniques, and methods disclosed herein may also be implemented in alternate configurations. In one alternate configuration, both emitters and detectors of the types described herein may be included on a single retractable tape similar to retractable emitter strip 111, retractable detector strip 113, and/or retractable strips 311. A single retractable strip of this type may be used to determine the position of an object on a surface. One or more emitters on the single retractable strip adjacent to a surface transmit optical energy. Some of the optical energy may be reflected back to one or more detectors on the same retractable strip from an object on or near the surface.

In order to accomplish the techniques described herein using a single retractable strip of emitters and detectors, the emitters and/or detectors may be placed at a variety of angles with respect to each other such that some of them are aimed in directions that are not necessarily perpendicular to the retractable strip. In addition to the physical arrangement, the emitters and detectors may also be operated in a variety of combinations, patterns, and/or sequences to gather various sets of information from various emitter and detector combinations. The various combinations of emitters and detectors may be chosen based on their location and angular relationships with respect to each other. The single retractable strip may be used to obtain object position information for a display or a surface by extending the single retractable strip along a single edge of a display or surface.

In one variation of the single retractable strip implementation described above, more than one retractable tape that each includes both emitters and detectors may be used. For example, a first retractable tape having both emitters and detectors may be extended across one edge of a square or rectangular area while a second retractable tape having both emitters and detectors may be extended across another edge of the square or rectangular surface. The detectors on the first retractable tape may receive optical energy originally transmitted from emitters of the first retractable tape, the second retractable tape, or a combination thereof. The emitters and detectors of the two retractable tapes may be operated in various patterns, combinations, and/or sequences with respect to each other. In a further variation, more than two retractable tapes each containing both emitters and detectors may be used along various edges of a display or surface. In yet another variation, the multiple retractable tapes used may be a combination of one or more retractable tapes which include both emitters and detectors and one or more retractable tapes that include only emitters or detectors.

In some cases, control of the emitters and or detectors may be performed by a dedicated or application-specific device such as, for example, a single chip optical controller. Optical controllers of this type are manufactured by companies such as Neonode, Inc. Control of the emitters may include activating them at preferred times and in preferred sequences while control of the detectors may include reading data from the detectors, or combinations of the detectors, at preferred times and in preferred sequences relative to the operation of the emitters. The controller may also include LED drivers, amplifiers, multiplexers, voltage regulators, filters, and other devices for controlling the emitters and/or detectors. In some cases, a dedicated controller or chip may increase the scanning speed enabling it to more effectively detect quick movements on the surface and/or detect multiple touches or objects. Even though an optical controller of the type described above may be used, some functions of the apparatus may still be performed by a separate microprocessor, microcontroller, or computer.

Figures 6A, 6B:
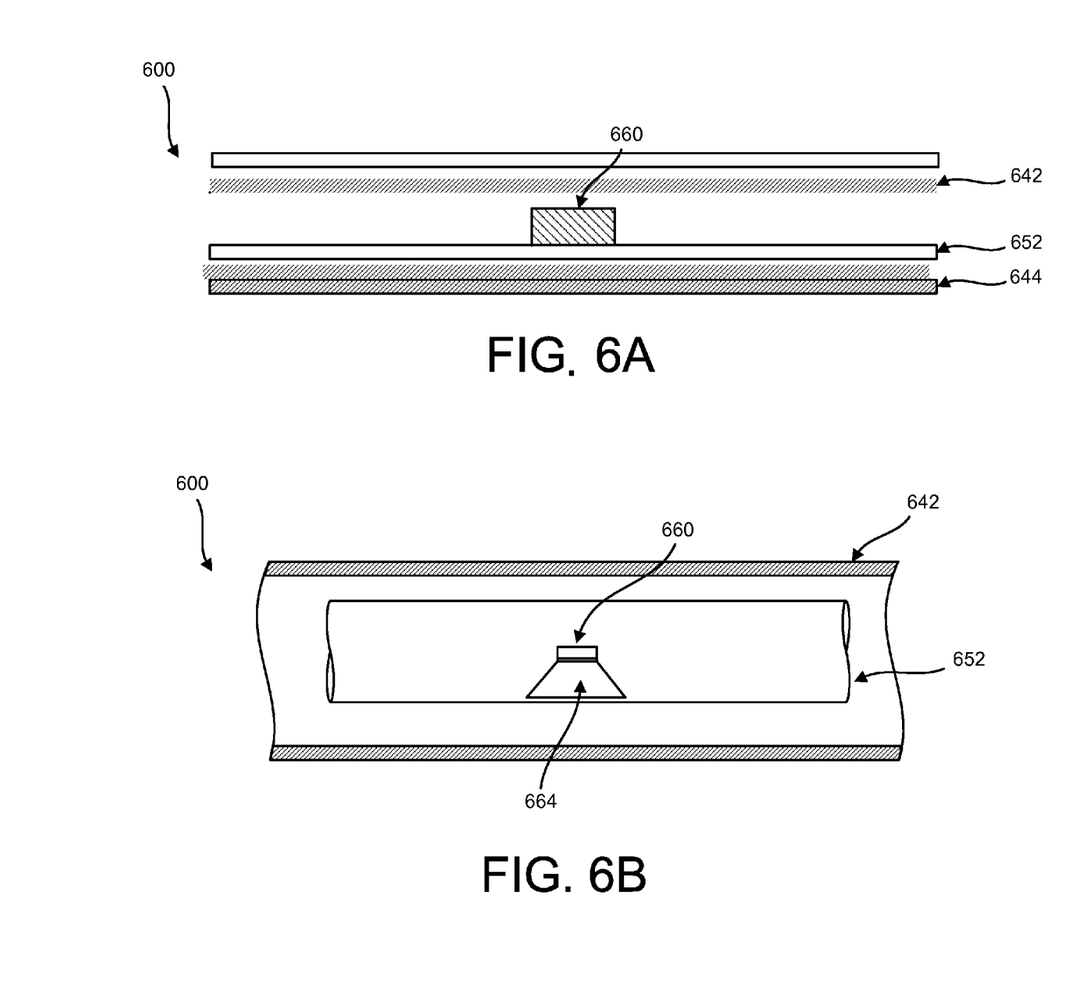
FIG. 6A illustrates a side cross sectional view of a retractable strip of emitters.
FIG. 6B illustrates a top cross sectional view of the retractable strip of FIG. 6A.

FIG. 6A illustrates a side cross sectional view of a retractable strip 600 of emitters. Retractable strip 600 is an example of retractable emitter strip 111 and retractable strips 311. For purposes of illustration only a single emitter 660 is shown. Emitter 660 is an example of emitters 112 and/or emitters 212. The orientation of emitter 660 is such that its primary direction of emission is either into the page or out of the page. Retractable strip 600 includes a flexible printed circuit board (FPC) 652 to which emitter 660 and other emitters (not shown) are attached. Layer 642 covers the optical elements. Other optical elements, such as a lens, may also be included in order to achieve a desired optical pattern. FIG. 6B illustrates a top cross sectional view of retractable strip of FIG. 6A with emitter optics 664 in front of emitter 660. Emitter optics 664 may be a lens or other device for altering the optical characteristics of the emitted energy. The emitter optic elements may be individual components, as illustrated, or a single mechanical structure may contain multiple emitter optic elements.

The FPC, emitters, and emitter optics, if any, may be sandwiched between substrates, such as substrates 642 and 644, as illustrated. These substrates may provide protection to the FPC, emitters, and emitter optics. In addition, these substrates may provide other mechanical properties which cause the retractable tape to behave in a preferred manner. For example, the substrates may force the structure to have curved cross section, such as the curved cross section of a retractable metal measuring tape, which causes it to default or relax into a linear state absent other forces. The retractable tapes may also be implemented in other flexible forms such as in an adjustable or bendable mechanical structure such as, for example, a flexible cable carrier or an Igus® Energy Chain®.

In some implementations, a computer software program operating on an electronic device such as a computer, laptop, tablet, server, mobile computing device, or mobile phone may control the operation of one or more of apparatus 110, apparatus 210, and/or apparatus 310. The computer software program may also permit a user to configure, calibrate, monitor, and/or select user-configurable options on one or more of apparatus 110, apparatus 210, and/or apparatus 310. The electronic device may serve as a system controller for the apparatuses. Alternatively, the system controller may be a dedicated, application-specific electronic device for controlling and/or communicating with the apparatuses.

Figure 7:
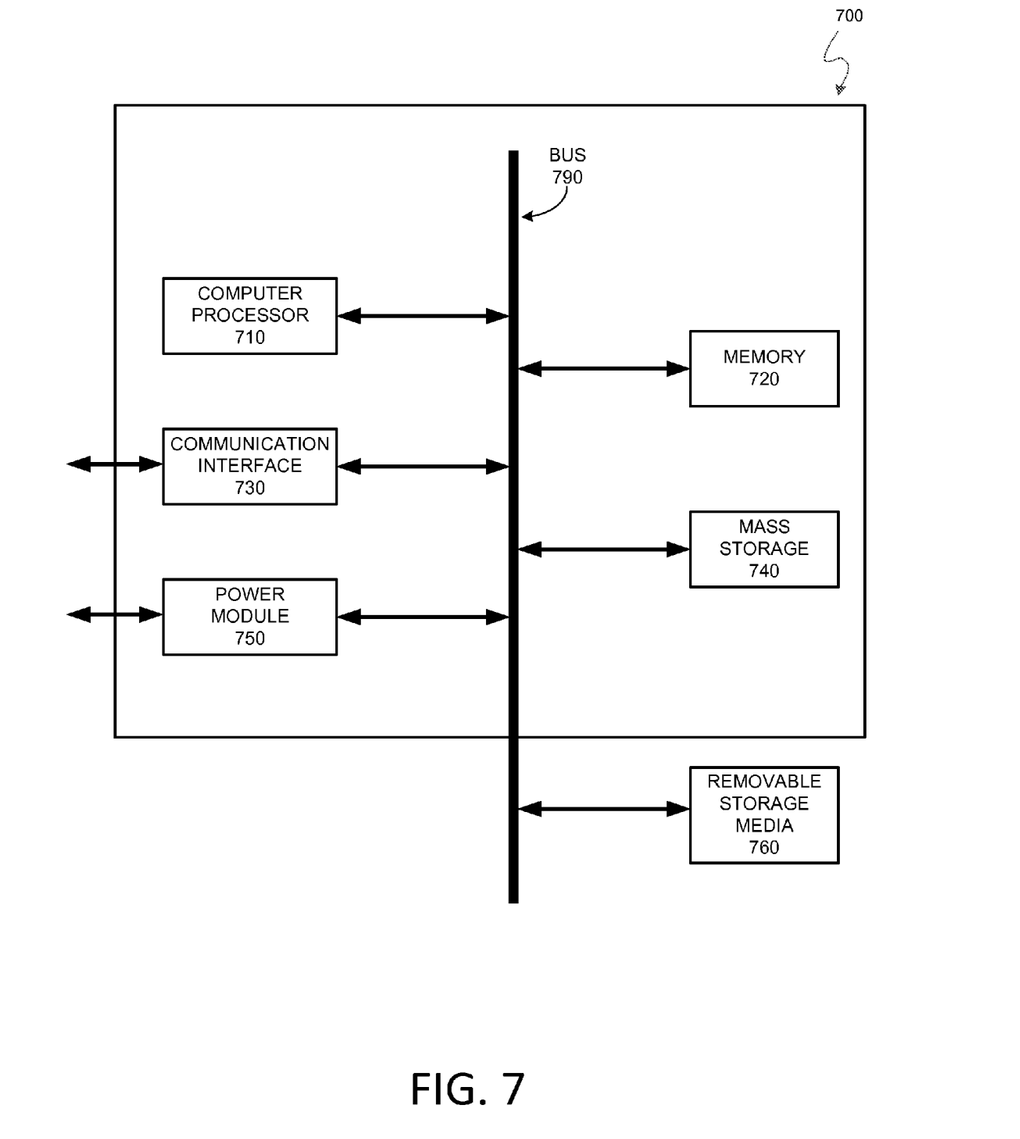
FIG. 7 illustrates a computer system which may be used in implementing the techniques, apparatuses, systems, and methods disclosed herein.

FIG. 7 illustrates computer system 700 with which some embodiments of the techniques disclosed herein may be implemented or utilized. A computing system, such as computing system 700, may be used to implement functions of apparatus 110, apparatus 210, apparatus 310, and/or a system controller.

According to the example of FIG. 7, computer system 700 includes a bus 790, at least one computer processor 710, at least one communication interface 730, at least one memory 720, at least one mass storage device or module 740, and at least one power module 750. A removable storage media 760 may also interface to bus 790 of computer system 700 as illustrated.

Computer processor 710 can be any known computer processor, central processing unit, microprocessor, microcontroller, digital signal processor, programmable logic array, or programmable logic device, or a combination thereof. Computer processor 710 may also interface to a coprocessor.

Communication interface 730 can be any type of interface for communicating with another device or a network. Communication interface 730 may be configured for communicating using a wired connection, a wireless connection, audio signals, light waves, infrared, or a combination thereof. Communication interface 730 may be configured for communicating with or over a network such a Local Area Network (LAN), Wide Area Network (WAN), or any network to which computer system 700 connects. Communication interface 730 may also be configured to communicate with an electronic device such as a cellular phone, a smartphone, a tablet, a laptop computer, a server, or a digital audio device. The various functions of communication interface 730 may be distributed across multiple communication interfaces. In one example, communication interface 730 includes Bluetooth Low Energy communication capabilities.

Memory 720 can include random access memory (RAM), or any other type of dynamic data storage device commonly known in the art. Memory 720 may also include one or more static storage devices such as read only memory (ROM), programmable read only memory (PROM), flash memory, magnetic memory, erasable programmable read only memory (EPROM), and/or electrically erasable programmable read only memory (EEPROM) for storing static data such as firmware or non-transitory machine-executable instructions for use by computer processor 710 or for another computer processor.

Mass storage 740 can include one or more persistent mass data storage devices or modules that may be used to store data, information, and/or instructions. Mass storage 740 may include a hard drive, a tape drive, an optical drive, flash memory, a micro electromechanical storage device, or a combination thereof.

Power module 750 can be any type of module for receiving, storing, and or providing electrical power. The functions of power module 750 may be spread across multiple power interfaces. Power module 750 may include a battery and may interface to external devices for purposes of charging the battery. The functions of power module 750 may also be combined into a single connector and/or interface with communication interface 730. For example, the functions of communication interface 730 and power module 750 may both be implemented in the form of one or more USB interfaces.

Removable storage media 760 can be any kind of external data storage device including a hard drive, a memory card, a subscriber identity module (SIM) card, flash memory, an optical drive, a tape drive, a micro electromechanical storage device, or a combination thereof.

Bus 790 communicatively couples the elements of computer system 700, as well as removable storage media 760. Bus 790 may conform to an industry standard bus architecture and protocol or may use a proprietary architecture and/or protocol.

Figure 8:
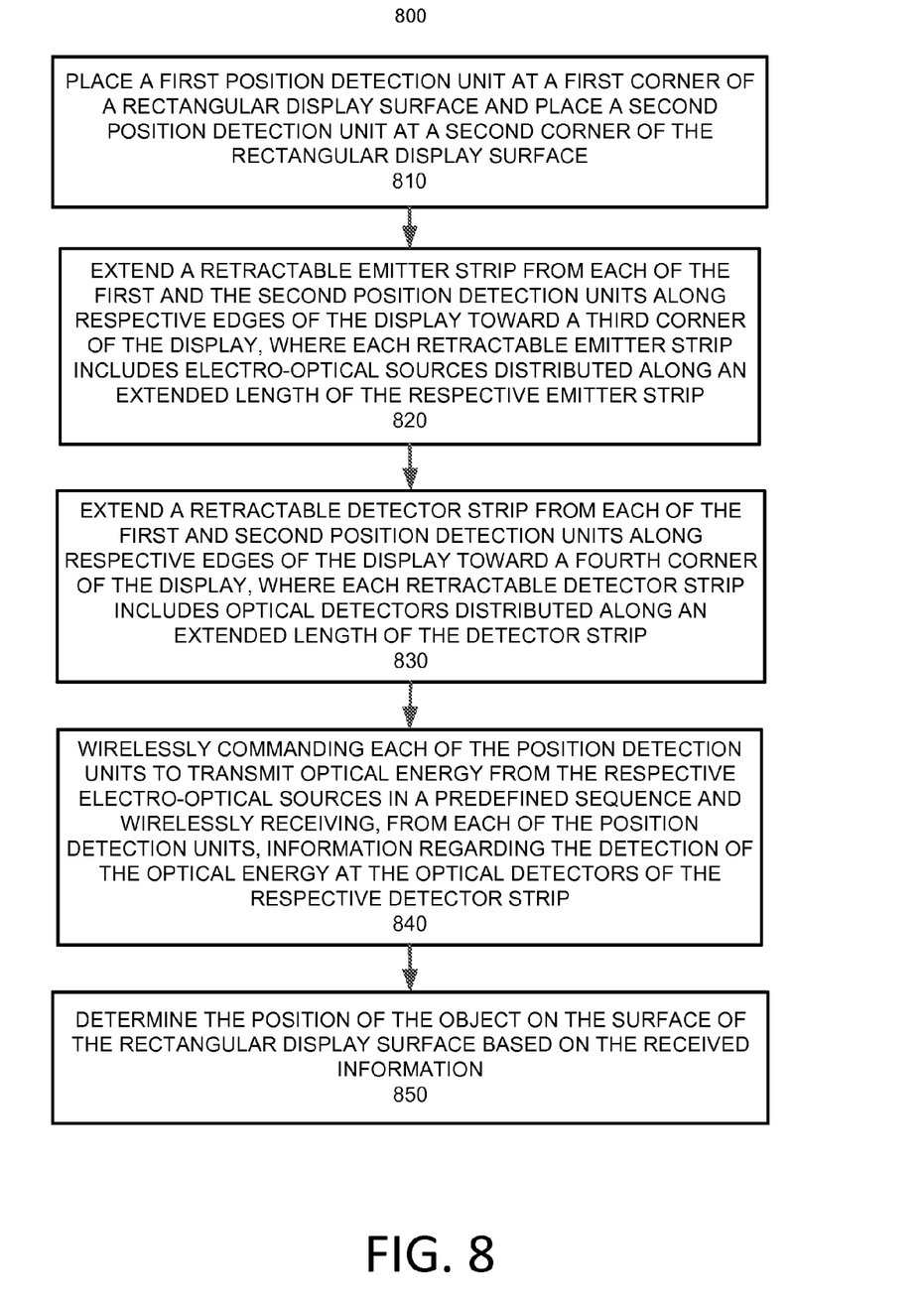
FIG. 8 illustrates one exemplary method of determining a position of an object on a surface.

FIG. 8 illustrates method 800 of determining a position of an object on a rectangular display surface. At step 810, method 800 includes placing a first position detection unit at a first corner of the rectangular display surface and placing a second position detection unit at a second corner of the rectangular display surface. At step 820, method 800 further includes extending a retractable emitter strip from each of the first and the second position detection units along respective edges of the display toward a third corner of the display. Each retractable emitter strip includes a plurality of electro-optical sources distributed along an extended length of the respective emitter strip.

At step 830, method 800 further includes extending a retractable detector strip from each of the first and second position detection units along respective edges of the display toward a fourth corner of the display. Each retractable detector strip includes a plurality of optical detectors distributed along an extended length of the detector strip and each extended emitter strip is opposite an extended detector strip with respect to the display. At step 840, method 800 includes wirelessly commanding each of the position detection units to transmit optical energy from the respective electro-optical sources in a predefined sequence and wirelessly receiving, from each of the position detection units, information regarding the detection of the optical energy at the optical detectors of the respective detector strip. Finally step 850 of method 800 includes determining the position of the object on the surface of the rectangular display surface based on the received information. Many other methods and variations are possible.

In another variation, a system for determining a position of an object on a surface is provided. The system includes a first transponder module and a second transponder module. Each transponder module is an example of apparatus 110, apparatus 210, and/or apparatus 310. Each transponder module also includes a housing, such as housing 318, and control circuitry.

Each transponder module also includes a first flexible substrate extendable from the housing in a first direction. The first flexible substrate has a set of optical emitters distributed along its length that are electrically connected to the control circuitry. The first flexible substrate is an example of retractable emitter strip 111. Each transponder module also includes a second flexible substrate extendable from the housing in a second direction that is different than the first direction. The second flexible substrate has a set of optical detectors distributed along its length that are electrically connected to the control circuitry. The second flexible substrate is an example of retractable detector strip 113.

The control circuitry of each transponder module is configured to control the set of optical emitters of the associated transponder module to direct optical energy across the surface toward the set of the optical detectors of the other transponder module. The control circuitry of each transponder is further configured to receive data from the set of optical detectors of the associated transponder modules. The data relates to reception of optical energy directed from the set of optical emitters of the other transponder module across the surface. The optical reception data from the two transponder modules is combined to determine the position of the object on the surface. The data may be combined by one of the transponder modules, the other transponder module, or by a separate system controller or computing device.

Some or all of the steps and operations associated with the techniques introduced here may be performed by hardware components or may be embodied in machine-executable instructions that cause a general purpose or special purpose computer processor programmed with the instructions to perform the steps. Alternatively, the steps may be performed by a combination of hardware, software, and/or firmware.

The apparatuses, systems, methods, techniques, and components described herein are meant to exemplify some types of possibilities. In no way should the aforementioned examples limit the scope of the invention or solutions provided herein, as they are only exemplary embodiments.

The foregoing disclosure has been presented for purposes of illustration and description. Other modifications and variations may be possible in view of the above teachings. The examples described in the foregoing disclosure were chosen to explain the principles of the concept and its practical application to enable others skilled in the art to best utilize the invention. It is intended that the claims be construed to include other alternative embodiments of the invention except as limited by the prior art.

The phrases "in some embodiments," "according to some embodiments," "in the embodiments shown," "in other embodiments," "in some examples," "in some cases," "in some situations," "in one configuration," "in another configuration" and the like generally mean that the particular feature, structure, or characteristic following the phrase is included in at least one embodiment of the present invention and/or may be included in more than one embodiment of the present invention. In addition, such phrases do not necessarily refer to the same embodiments or different embodiments.

What is claimed is:

1. An apparatus comprising:
   a retractable emitter strip extendable from the apparatus, the retractable emitter strip including a plurality of electro-optical emitters for generating first optical energy and directing the first optical energy across a planar surface when the retractable emitter strip is extended, the plurality of electro-optical emitters distributed along a length of the retractable emitter strip;
   a retractable detector strip extendable from the apparatus, the retractable detector strip including a plurality of optical detectors for receiving second optical energy directed across the planar surface from a second retractable emitter strip of another apparatus when the retractable detector strip is extended, the plurality of optical detectors distributed along a length of the retractable detector strip, wherein the retractable emitter strip and the retractable detector strip extend in different directions from the apparatus;
   electrical circuitry configured to:
      electrically drive the plurality of electro-optical emitters to produce the first optical energy according to a predefined pattern;
      process electrical signals received from the plurality of optical detectors to generate object location information, wherein the object location information relates to a location of an object on the planar surface; and
      wirelessly transmit the object location information to a system controller; and
   a power source for powering the plurality of electro-optical emitters, the plurality of optical detectors, and the electrical circuitry.

2. The apparatus of claim 1 wherein the planar surface is a display surface of an electronic information display device, the apparatus further comprising a mounting mechanism for removably attaching the apparatus to a bezel of the electronic information display device, wherein the retractable emitter strip is extendable along a first edge of the display surface and the retractable detector strip is extendable along a second edge of the display surface.

3. The apparatus of claim 2 wherein the second optical energy is generated by another plurality of electro-optical emitters associated with the second retractable emitter strip of the another apparatus, the other plurality of electro-optical emitters positioned on an opposite edge of the display surface from the plurality of optical detectors such that the optical energy has a primary direction that is substantially perpendicular to a primary direction of the second optical energy.

4. The apparatus of claim 1 wherein the apparatus is positionable on the planar surface in a first location and the electrical circuitry is further configured to:
   wirelessly receive second object location information from the second retractable emitter strip of the another apparatus that is positioned at a second location on the planar surface that is different than the first location; and
   determine the location of the object on the planar surface based on the object location information and the second object location information.

5. The apparatus of claim 1 further comprising a rotating spool for storing one or both of the retractable emitter strip and the retractable detector strip in a rolled configuration when not in use.

6. The apparatus of claim 1 wherein the power source includes a rechargeable battery.

7. The apparatus of claim 1 wherein one or both of the optical energy and the second optical energy includes infrared energy.

8. The apparatus of claim 1 wherein to drive the plurality of electro-optical emitters to produce the first optical energy includes to:
   determine a portion of the retractable emitter strip that is extended from the apparatus; and
   drive the electro-optical emitters of the plurality of the electro-optical emitters that are located in the extended portion of the retractable emitter strip.

9. The apparatus of claim 1 wherein each of the retractable emitter strip and the retractable detector strip includes a respective substrate that relaxes into a substantially linear state when extended.

10. A system for determining a position of an object on a surface, the system comprising:
   a first transponder module and a second transponder module, each including:
      a housing;
      control circuitry in the housing;
      a first flexible substrate extendable from the housing in a first direction, the first flexible substrate having a set of optical emitters distributed along a length of the first substrate and electrically connected to the control circuitry; and
      a second flexible substrate extendable from the housing in a second direction that is different than the first direction, the second substrate having a set of optical detectors distributed along a length of the second substrate and electrically connected to the control circuitry;

wherein the control circuitry of each of the first and second transponder modules is configured to:
control the set of optical emitters of the associated transponder module to direct optical energy across the surface toward the set of the optical detectors of the other one of the first and second transponder modules; and
receive data from the set of optical detectors of the associated transponder modules, wherein the data relates to reception of optical energy directed from the set of optical emitters of the other one of the first and second transponder modules across the surface.

11. The system of claim 10 further comprising a system controller wherein the system controller receives the data from each of the first and second transponder modules and combines the data to determine the position of the object on the surface.

12. The system of claim 11 wherein the system controller is included in one or both of the first transponder module and the second transponder module.

13. The system of claim 11 wherein the first transponder module and the second transponder module each includes wireless communication circuitry for transmitting the respective data to the system controller.

14. The system of claim 10 wherein the first and second flexible substrates of the first transponder module have substantially linear configurations when extended and extend in directions approximately ninety degrees with respect to each other.

15. The system of claim 10 wherein the first and second transponder modules are positioned relative to each other such that the four extended flexible retractable substrates form a rectangular shape on the surface, the set of optical emitters of each transponder module being positioned on an opposite side of the rectangle from the set of optical detectors of the other transponder module.

16. The system of claim 10 wherein the optical energy includes energy having a wavelength in the infrared range.

17. The system of claim 10 wherein the surface includes a display surface of an electronic display and wherein each of the first and second transponder modules includes a mounting mechanism for removably mounting the respective one of first and second transponder module to the electronic display.

18. The system of claim 10 wherein the system is operational when one or both of the first and second flexible extendable substrates is not fully extended.

19. The system of claim 18 wherein the electronic circuitry detects an extended portion of at least one of the first and second flexible extendable substrates and directs the optical energy from only a subset of the optical emitters that is in the extended portion of the at least one of the first and second flexible extendable substrates.

20. A method of determining a position of an object on a rectangular display surface, the method comprising:
placing a first position detection unit at a first corner of the rectangular display surface and placing a second position detection unit at a second corner of the rectangular display surface, wherein the first corner and the second corner are opposite corners of the rectangular display surface;
extending a retractable emitter strip from each of the first and the second position detection units along respective edges of the display toward a third corner of the rectangular display surface, wherein each retractable emitter strip includes a plurality of electro-optical sources distributed along an extended length of the respective retractable emitter strip;
extending a retractable detector strip from each of the first and second position detection units along respective edges of the display toward a fourth corner of the display, wherein each retractable detector strip includes a plurality of optical detectors distributed along an extended length of the retractable detector strip, wherein the extended retractable emitter strips and the extended retractable detector strips substantially form a rectangle around a perimeter of the rectangular display surface, and wherein each extended retractable emitter strip of one of the first and second position detection units is opposite an extended retractable detector strip of another one of the first and second position detection units with respect to the rectangular display surface;
wirelessly commanding each of the first and second position detection units to transmit optical energy from the respective electro-optical sources in a predefined sequence;
wirelessly receiving, from each of the first and second position detection units, information regarding the detection of the optical energy at the optical detectors of the respective retractable detector strip; and
determining the position of the object on the rectangular display surface based on the received information.

* * * * *